INVENTORS
GEIR BJORNSON
E. L. CZENKUSCH 3,337,520
ISOPRENE POLYMERIZATION
Geir Bjornson and Edward L. Czenkusch, Bartlesville, Okla., assignors to Phillips Petroleum Company, a corporation of Delaware
Filed Oct. 22, 1962, Ser. No. 231,921
7 Claims. (Cl. 260—94.3)

This invention relates to the polymerization of isoprene to form normally solid polymer. In another aspect it relates to an improved catalyst which can be used to polymerize isoprene with or without comonomers at high rates.

It has been disclosed in the patent to J. P. Hogan and R. L. Banks, 2,825,721 issued March 4, 1958, that certain olefins can be polymerized to heavy polymers in the presence of catalysts which comprise chromium oxide associated with at least one oxide selected from the group consisting of silica, alumina, zirconia and thoria. This catalyst can be activated by calcining for a time sufficient to least at least a portion of the chromium present in the hexavalent state. The activity of this catalyst can be increased by a limited treatment of the activated catalyst with carbon monoxide. We have discovered that a specific catalyst selected from the class described by Hogan and Banks and treated with carbon monoxide can be used to polymerize isoprene with unexpectedly high polymerization rates. The polyisoprene prepared by our invention is a solid rubbery composition of stereoregular configuration, being substantially all the result of 1,4-addition with very high trans content, that is 70 percent or greater.

According to our invention isoprene is polymerized by contact under polymerization conditions with a catalyst containing chromium oxide and non-porous, fine grain silica, said catalyst having been activated so that it contains chromium in the hexavalent state and then treated with carbon monoxide at about 300 to 900° F. We have found that superior results in polymerization activity are obtained when the temperature of the carbon monoxide treatment is limited to a preferred range of 500 to 700° F., that still greater activity is obtained when the temperature is limited to 550 to 600° F. The duration of the carbon monoxide treatment can vary considerably, for example from 1 to 90 minutes or more. Within the preferred temperature range, the treatment should be carried out for at least 10 minutes and a period of 15 minutes to 60 minutes is preferred. Superior polymerization rates are obtained when the carbon monoxide treatment is limited to 15 to 30 minutes. One of the important features of our invention lies in the specific silica component of the catalyst, this silica being of the non-porous type composed of grains having a mean diameter of about 50 to 1000, preferably 150 to 200, Angstroms with a specific surface area of about 10 to 600, preferably below 450, square meters per gram.

Figure 1:
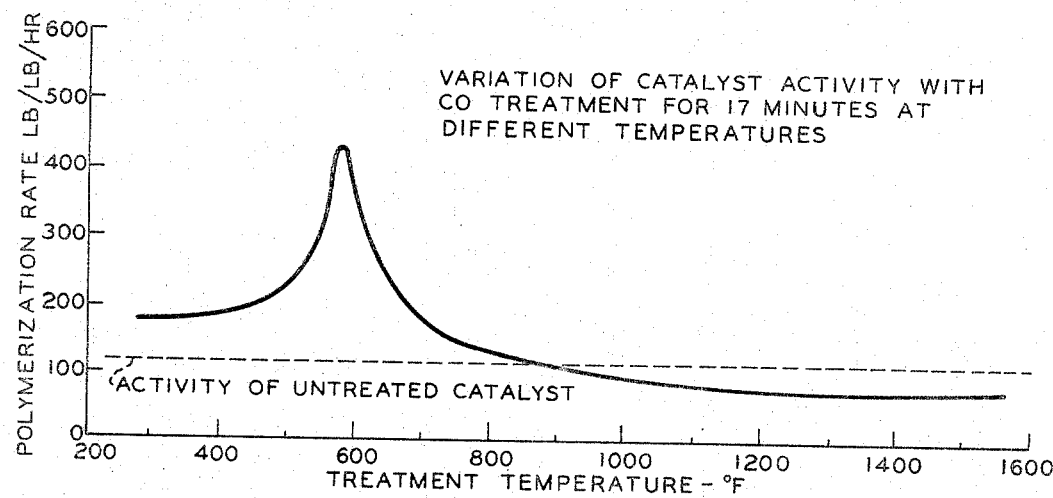
Figure 2:
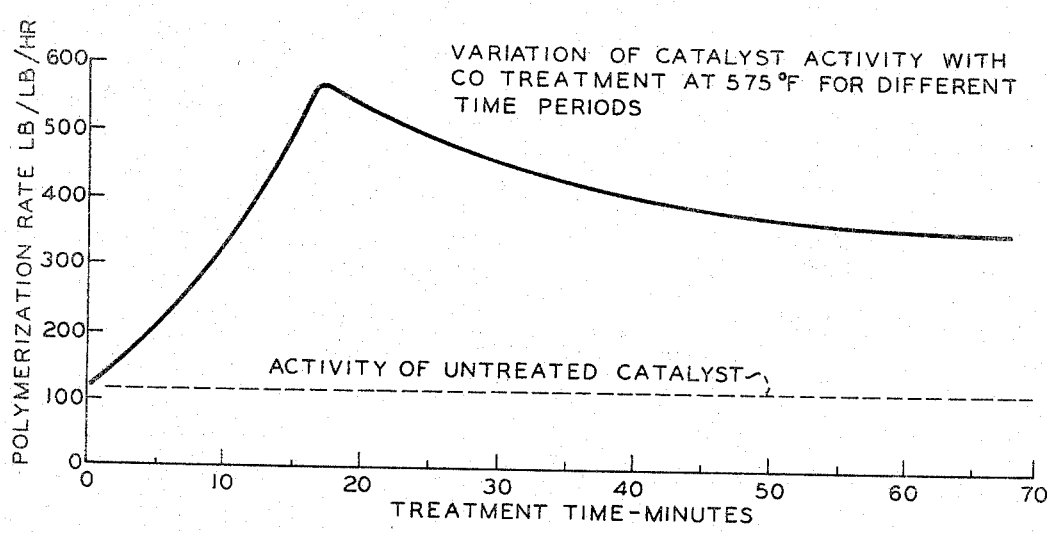

It is an object of our invention to provide an improved method for polymerizing isoprene. Still another object of our invention is to provide a catalyst which can be used to polymerize isoprene to normally solid, rubbery polymer. Another object of our invention is to provide a method of making polyisoprene formed by 1,4-addition of the isoprene and having a high trans content. Other objects, advantages and features of our invention will be apparent to those skilled in the art from the following discussion and drawings in which FIGURE 1 is a graph illustrating the relationship of catalyst activity to the temperature of treatment of the catalyst with carbon monoxide, and FIGURE 2 is a graph illustrating the relationship of catalyst activity to the length of time of catalyst treatment with carbon monoxide.

Our invention is preferably directed to the production of polyisoprene although copolymers of isoprene with minor amounts of other olefins such as ethylene, styrene and butadiene can also be produced to advantage with our improved catalyst. For example, a major amount of isoprene can be copolymerized with minor amounts of mono- and diolefins have up to 8 carbon atoms per molecule. Examples of mono-1-olefins which can be copolymerized with isoprene include ethylene, propylene, 1-butene, 1-pentene, 4-methyl-1-pentene, 1-octene, and the like. Examples of conjugated dienes having 4 to 8 carbon atoms include 1,3-butadiene, piperylene, 1,3-octadiene, and the like.

The polymerization can be carried out with monomer alone or an inert diluent or solvent such as cyclohexane, xylene, pentene, benzene, toluene, or the like can be used. The polymer can be formed either in solution or as a suspension in the reaction medium. Temperatures ranging from −50 to 400° F. can be used with pressures of about 0 to 2,000 p.s.i.g. The preferred polymerization conditions are normally about 100 to 250° F. and 5 to 500 p.s.i.g., depending upon the nature and volatility of the monomer and diluent. Polyisoprene can be prepared very conveniently without using a diluent at a temperature of 150° F. and 50 p.s.i.g. The reaction lends itself to either a batch or continuous operation and the reaction time is normally from about 0.1 minute to 10 hours, preferably about 0.5 to 5 hours. Catalyst concentrations can vary over a broad range, for example, in a stirred reactor from about 0.001 to 20 weight percent of the reaction mixture. When the polymerization is completed, the polymer can be recovered by any convenient method, for example by evaporation of the reactor contents at 50 to 150° F. and at reduced pressure in order to remove the volatile materials from the solid polymer.

The catalyst used in our invention contains chromium oxide on silica, the silica being a non-porous, powdery solid of relatively low surface area. The purity of the silica component is normally greater than 99 percent and the chromium content of the catalyst can range from 0.025 to 50 weight percent, but usually is about 0.5 to 10 and preferably about 1.0 to 5.0 weight percent of the total catalyst. The silicas used are composed of fine grains having a mean diameter of about 50 to 1000, preferably 150 to 200, Angstroms and a specific surface area of about 10 to 600 square meters per gram, preferably about 150 to 250 square meters per gram and more preferably about 175 to 225 square meters per gram. This surface corresponds to the external surface of largely spherical grains of the given diameter and indicates an almost total absence of porosity. The silicas can be prepared by precipitation but are preferably made by hydrolysis of silicon tetrachloride at very high temperatures. Silicas of this preferred type are available under the trade name CAB-O-SIL, a product of Godfrey L. Cabot, Inc., Boston, Massachusetts.

The catalyst can be prepared by distributing a solution of chromium oxide or a compound convertible to chromium oxide over the silica. For example a solution of chromic nitrate, chromic chloride or other soluble salts of chromium can be sprayed over the silica while stirring to produce the uniformly wet powder. After the silica has been treated in this manner the catalysts are dried to remove excess moisture. In drying the catalyst solids normally become caked and some mechanical grinding is thereafter required. The catalyst particles are screened to obtain the desired particle size. Particles having a particle size (U.S. sieve scale) from about 10 to 200 mesh are satisfactory. The solids are then activated for periods up to 50 hours at temperatures ranging from 450 to 2100° F. The atmosphere in which the catalyst is activated should be nonreducing and preferably contains oxygen. Normally the activation temperature is in the range of about 750 to 1500° F. and, for our invention, activation in the range of about 900 to 1100° F. is preferred. The activating gases should be substantially water-free, for example with a dew point below 75° F. and preferably below 0° F.

The duration of the activation process can vary considerably so long as the catalyst is left with at least a portion of the chromium in the hexavalent state, for example, so that the catalyst contains at least 0.025 weight percent hexavalent chromium. The activation period can range from 30 minutes up to 50 hours or more but is more frequently in the range of about 1 to 10 hours.

Following activation of the catalyst as described above, the active catalyst is treated by contact with carbon monoxide at a temperature in the range of 300 to 900° F. As shown by the graph in FIGURE 1, the activity of the catalyst can be improved by carbon monoxide treatment within the temperature range of 300 to 900° F. This graph is based upon the data given in Example I. As can be seen from FIGURE 1, the preferred treating temperature is within the range of 500 to 700° F. and surprisingly high catalyst activity is obtained when the temperature treatment is restricted within the range of 550 to 600° F.

As shown in FIGURE 2 which is based upon the data of Example II, the length of time for carbon monoxide treatment can vary considerably while still resulting in an improvement in catalyst activity. As shown by this graph the period of treatment should be at least 10 minutes and preferably at least 15 minutes. Maximum activity is obtained when the duration of treatment is in the range of 15 to 30 minutes and there does not appear to be appreciable change in activity when the treatment period is extended beyond 60 minutes. Although pure carbon monoxide can be used, it is preferably diluted with an inert gas such as helium, nitrogen, carbon dioxide, argon or the like. In order to ensure adequate contact between the catalyst and the carbon monoxide, the gas stream should contain at least 10 volume percent and preferably at least 20 volume percent carbon monoxide with the remainder being inert to the catalyst and to the carbon monoxide under the conditions of the contacting. The treating gas, like the activating gas, should be substantially anhydrous. Any method of gas-solids contacting can be employed, for example with the catalyst in a stationary or fluidized bed.

The polyisoprene and its copolymers produced by this invention are processable and have been found useful in the production of a number of products such as floor tile, shoe soles, tire treads and the like. The polymers can be used alone or blended with natural rubber or other synthetic rubber, for example a 50/50 blend of cis-polybutadiene and the polyisoprene of our invention compounded in a conventional tread stock recipe with 50 phr. carbon black and a similar blend of the polyisoprene with natural rubber cures to provide a product having good physical properties demonstrating the utility of the blends as tire treads. The polyisoprene can also be compounded with mineral fillers in floor tile and shoe sole formulations to produce compositions having physical properties comparing well with similar compositions using natural rubber or SBR.

Determination of the microstructure shows that at least 70 percent, generally 70 to 85 percent, of the polyisoprene has been formed by 1,4-addition and has the trans configuration, 0.1–2 percent has been formed by 3,4-addition, and remainder by 1,4-addition and has cis configuration. Polymer formed by 1,2-addition is negligible. The microstructure of the polymer is determined as follows:

Microstructures of the polyisoprene were determined with a commercial infrared spectrometer using a 2.5 percent solution of the rubber in carbon disulfide. The 1,4-addition with trans configuration was determined at the 8.7 micron band by direct comparison with a solution of balata, the natural trans isomer. Using a calibration for butadiene of 173 liters-mols$^{-1}$ centimeters$^{-1}$, the 1,2-addition was determined at the 11.0 micron band. The 3,4-addition was determined at the 11.25 micron band assuming the same absorptivity as polybutadiene and correcting for an absorption band present in the natural polymer not due to 3,4-addition.

In order to illustrate further the advantages of our invention the following examples are presented. The conditions and proportions used in the examples are typical only and should not be construed to limit our invention unduly.

*Example I*

A 292.3 g. quantity of flame hydrolyzed silica (Cab-O-Sil) was slurried with a solution of 56.25 g.

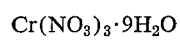

$$Cr(NO_3)_3 \cdot 9H_2O$$

in 1700 cc. water forming a thin paste. This silica was 99.0 to 99.7 percent pure with a particle size in the range of 150 to 200 Angstroms and a surface area based on nitrogen adsorption of 175 to 200 square meters per gram. The slurry was then dried under reduced pressure at 212° F. for 48 hours. The resulting lumpy composite was ground in a mortar and screened until it passed through a U.S. No. 12 mesh screen. The 12–30 mesh fraction was then heated in dry air at 950° F. for 18 hours followed by a treatment consisting of exposure to a gas consisting of 42 volume percent CO and 58 percent $N_2$ for 17 minutes at 500° F. The space velocity based on the CO was 492 v./v./hr. Dry nitrogen was flowed over the catalyst solid while the temperature was being adjusted both before and after the treatment. The catalyst was stored under dry nitrogen until used.

A 0.2577 g. quantity of the catalyst was charged into a 1400 cc. stainless steel agitated reactor (which had previously been purged with nitrogen) together with 476 g. isoprene. The vessel was sealed and the contents permitted to react at 150° F. for 2 hours at a maximum pressure of 60 p.s.i.g. When the vessel was again opened, 115.2 g. of a white agglomerated rubbery polymer was recovered.

To determine optimum catalyst treating conditions, a series of catalyst preparations were carried out in a manner identical to that described above except that the temperature of the treatment was varied. Each resulting catalyst was then tested for isoprene polymerization as described above. The results are given in Table I below and in FIGURE 1. The productivity is expressed as pounds of polymer obtained per pound of catalyst per hour.

TABLE I.—EFFECT OF CO TREATING TEMPERATURE ON ACTIVITY OF NON-POROUS SILICA-SUPPORTED CHROME OXIDE CATALYST

| Run No. | Temperature (° F.) | Productivity |
| --- | --- | --- |
| 1 | (not reduced) | 116.0 |
| 2 | 300 | 173.5 |
| 3 | 500 | 225.0 |
| 4 | 575 | 442.0 |
| 5 | 575 | 443.0 |
| 6 | 600 | 346.0 |
| 7 | 700 | 171.0 |
| 8 | 900 | 126.5 |
| 9 | 1,200 | 108.0 |
| 10 | 1,500 | 49.5 |

The data obtained indicated that the best catalyst treating temperature was about 550 to 600° F.

*Example II*

A portion of the dried catalyst solid prepared in Example I (minus 50 mesh) was subjected to 18 hours at 950° F. in air followed by 17 minutes in 23% CO and 77% $N_2$ at 575° F.

A 0.2477 g. portion of the pretreated catalyst was placed in a 1400 ml. reactor with 454 g. isoprene and allowed to react 1 hour at 150° F. and a maximum pressure of 55 p.s.i.g. After the reaction period, 148 g. of a white agglomerated solid was obtained (Run 13).

Several other similar runs were made to note the effect of treating time on the activity of the catalyst. In this series all other conditions were kept substantially constant. The results are shown in Table II below and in FIGURE 2.

TABLE II.—EFFECT OF CO TREATING TIME ON ACTIVITY OF NON-POROUS SILICA-SUPPORTED CHROME OXIDE CATALYST

| Run No. | Time (Min.) | Productivity |
|---|---|---|
| 11 | 0.0 | 116 |
| 12 | 8.5 | 291 |
| 13 | 17.0 | 596 |
| 14 | 17.0 | 542 |
| 15 | 30.0 | 454 |
| 16 | 60.0 | 360 |

The results indicated that the best catalyst treating time was about 15 to 30 minutes.

*Example III*

For comparison purposes, a silica-alumina supported chromium oxide catalyst was prepared and used in an isoprene polymerization reaction.

A 100 g. quantity of a commercial 87:13 silica-alumina (approx. 100–300 mesh, 540 m.$^2$/g. surface area, 65 A. pore diam.) was stirred with a solution of 4.19 g. $CrO_3$ in 98.3 cc. water until the solid was completely wetted. The wet material was then dried for 48 hours at 212° F. and at reduced pressure. The resulting dry catalyst powder was then air activated for 18 hours at 950° F. followed by a treatment comprising exposure to a 42 percent CO and 58 percent $N_2$ gas stream at a CO space rate of 492 v./v./hr. at 575° F. for 17 minutes.

A 0.2416 g. quantity of the above prepared catalyst was charged into a 1400 cc. stainless agitated reactor (previously purged with nitrogen) together with 454 g. isoprene. The temperature was adjusted to 150° F. and the reaction was permitted to continue for 1 hour at a maximum pressure of 54 p.s.i.g. When the vessel was opened, 1.1 g. isoprene polymer was recovered upon evaporation of the contents. The polymer was a hard grainy solid which was not millable or processable.

*Example IV*

For comparison purposes a catalyst comprising a porous silica (silica gel) and chromium oxide was prepared, activated with the inventive treatment, and tested for activity.

A 47.3 g. quantity of commercial silica gel (100–325 mesh, pore diam. 188 A., pore volume 1.20 cc./g., surface area 256 m.$^2$/g., containing only 0.022% alumina) was stirred with a solution of 8.6 g. $Cr(NO_3)_3 \cdot 9H_2O$ in 95 cc. water and then dried, activated and treated with CO in a manner identical with the optimum conditions found in Run 13 of Example II.

A quantity of the silica gel supported catalyst was used in an isoprene polymerization reaction under conditions essentially identical to those of Run 13. The yield of isoprene polymer was 82.1 g. which indicated a productivity of 365 pounds per pound of catalyst per hour. This is significantly less than the productivity of 596 obtained with the non-porous silica catalyst in Run 13.

*Example V*

A 5 lb. quantity of polyisoprene prepared by accumulating the products from replicates of Run 13 in Example II was subjected to extensive evaluation. Portions of the polymer were given a preliminary treatment in a midget Banbury mixer at 270° F. and at 60 r.p.m. to yield a 44-Mooney polymer. At this point 0.5 part of an antioxidant (2,2'-methylene-bis(4-methyl-6-tert-butylphenol) per 100 parts polymer was added to protect the rubbery material during the subsequent testing.

A portion of the polyisoprene was compounded into a black reinforced stock. The following ingredients were incorporated into the polymer on a cold (room temperature) mill in parts per 100 parts polymer:

IRB#1 (HAF); (Industry Reference Black; high abrasion furnace black) _____ 50
Zinc oxide _____ 3
Stearic acid _____ 3
Flexamine (65% diarylamine-ketone reaction product and 35% N,N'-diphenyl-p-phenylenediamine) _____ 1
Philrich 5; (aromatic petroleum oil) _____ 5
Vultrol; (anti-scorch agent; B. F. Goodrich Chemical Co.) _____ 1
Sulfur _____ 2.25
NOBS special (N-oxydiethylene benzothiazole-2-sulfenamide) _____ 0.5

The formulation was cured 45 minutes at 292° F. Physical properties are shown in the following table.

TABLE III

| | |
|---|---|
| Compression set, percent | 19.6 |
| 300% modulus, p.s.i. | 1830 |
| Tensile, p.s.i. | 2920 |
| Elongation, percent | 420 |
| Lupke rebound, percent | 77 |
| Resilience, percent: | |
| −40° C. | 18.3 |
| 80° F. | 49.0 |
| 212° F. | 71.7 |
| Heat buildup, ° F. | 49.0 |
| Blowout, min. to failure | 7.2 |
| Shore A hardness | 63.0 |
| NBS abrasion resistance, rev./mil. | 22.60 |

The evaluation indicated that the polyisoprene would make suitable tread compound, the advantages being satisfactory milling and extrusion of the compound stock, and good resilient and heat buildup for the vulcanizate.

As will be apparent to those skilled in the art, various modifications can be made in our invention without departing from the spirit or scope thereof.

We claim:
1. A process for the homopolymerization of isoprene so as to obtain a solid rubbery product having a high trans- content which comprises contacting isoprene under polymerization conditions with a catalyst consisting of the product resulting from the treating of fine grain, non-porous silica having a mean diameter of about 50 to 1000 Angstroms and a specific surface area of about 10 to 600 square meters per gram with a chromium compound calcinable to chromium oxide, activating the resulting composite for a period up to 50 hours at a temperature in the range of 450 to 2100° F. and thereafter contacting the resulting active catalyst having a portion of the chromium therein present in the hexavalent state with carbon monoxide in an otherwise inert atmosphere for about 1 to 90 minutes at a temperature of about 500 to 700 F. and recovering the solid rubbery homopolymer of isoprene as a product of the process.

2. A process for the copolymerization of major amounts of isoprene and minor amounts of other mono- or diolefins having up to 8 carbon atoms per molecule which comprises contacting the mixture of isoprene and other mono- or diolefin under polymerization conditions with a catalyst consisting of the product resulting from the treating of fine grain, nonporous silica having a mean diameter of about 50 to 1000 Angstroms and a specific surface area of about 10 to 600 square meters per gram with a chromium compound calcinable to chromium oxide, activating the resulting composite for a period up to 50 hours at a temperature in the range of 450 to 2100° F. and thereafter contacting the resulting active catalyst having a portion of the chromium therein present in the hexavalent state with carbon monoxide in an otherwise inert atmosphere for about 1 to 90 minutes at a temperature of about 500 to 700° F. and recovering the copolymer as a product of the process.

3. The process of claim 1 wherein the catalyst is treated with carbon monoxide at a temperature in the range of 550 to 600° F. for a period of time in the range of 15 to 60 minutes.

4. A catalyst consisting essentially of about 0.025 to 50 weight percent chromium as chromium oxide and non-porous, fine grain silica, said catalyst having been activated by heating at about 450 to 2100° F. for a time sufficient to leave a portion of the chromium in the hexavalent state, and thereafter treated with carbon monoxide in an otherwise inert atmosphere for about 10 to 60 minutes at a temperature of 300 to 900° F.

5. A catalyst consisting essentially of 0.5 to 10 weight percent chromium as chromium oxide on an impregnated support of non-porous fine grain silica having a mean diameter of about 150 to 200 Angstroms and a specific surface of about 150 to 250 square meters per gram, said catalyst having been heated in dry air at 750 to 1500° F. for a sufficiently long period to leave a substantial portion of the chromium in the hexavalent state, and thereafter treated with carbon monoxide in an otherwise inert atmosphere for about 10 to 60 minutes at a temperature of about 500 to 700° F.

6. The catalyst of claim 5 wherein said carbon monoxide treatment is at a temperature in the range of 550 to 600° F. and for a time period in the range of 15 to 30 minutes.

7. The catalyst of claim 6 wherein the silica has been prepared by hydrolysis of silicon tetrachloride at high temperature.

References Cited

UNITED STATES PATENTS

| | | | |
|---|---|---|---|
| 2,825,721 | 3/1958 | Hogan et al. | 260—94.3 |
| 3,037,008 | 5/1962 | Garetson et al. | 260—94.9 |
| 3,091,605 | 5/1963 | Hull et al. | 260—93.7 |
| 3,132,125 | 5/1964 | Schwander et al. | 260—94.3 |
| 3,166,537 | 1/1965 | Gregg | 260—94.9 |

FOREIGN PATENTS 1,034,601   7/1958   Germany.

JOSEPH L. SCHOFER, *Primary Examiner.*

E. J. SMITH, J. A. SEIDLECK, *Assistant Examiners.*